(12) United States Patent
Thrush

(10) Patent No.: US 7,232,013 B2
(45) Date of Patent: Jun. 19, 2007

(54) BRAKE FORCE SENSOR

(75) Inventor: Christopher M. Thrush, Shelby Twp., MI (US)

(73) Assignee: Delphi Technologies, Inc., Troy, MI (US)

( * ) Notice: Subject to any disclaimer, the term of this patent is extended or adjusted under 35 U.S.C. 154(b) by 7 days.

(21) Appl. No.: 10/834,486

(22) Filed: Apr. 29, 2004

(65) Prior Publication Data

US 2005/0242664 A1 Nov. 3, 2005

(51) Int. Cl.
*F16D 66/02* (2006.01)

(52) U.S. Cl. .............................. 188/1.11 L; 188/1.11 E

(58) Field of Classification Search ................. 303/166, 303/160; 188/1.1 E, 73.1, 1.11 E, 1.11 L
See application file for complete search history.

(56) References Cited

U.S. PATENT DOCUMENTS

| | | | | | |
|---|---|---|---|---|---|
| 2,117,027 | A | * | 5/1938 | Langbein ..................... | 374/113 |
| 2,494,269 | A | * | 1/1950 | Sparkes ....................... | 340/449 |
| 3,553,642 | A | * | 1/1971 | Rike et al. ................... | 340/454 |
| 4,602,702 | A | * | 7/1986 | Ohta et al. ................... | 188/72.1 |
| 4,623,044 | A | * | 11/1986 | Ohta et al. ................... | 188/72.1 |
| 5,090,518 | A | * | 2/1992 | Schenk et al. ............. | 188/72.1 |
| 5,687,818 | A | * | 11/1997 | Nishizawa et al. ......... | 188/73.35 |
| 6,000,507 | A | * | 12/1999 | Bohm et al. ................. | 188/158 |
| 6,125,974 | A | * | 10/2000 | Nishizawa et al. ......... | 188/73.35 |
| 6,138,801 | A | * | 10/2000 | Shirai et al. ................. | 188/157 |
| 6,176,352 | B1 | * | 1/2001 | Maron et al. .............. | 188/1.11 E |
| 6,186,599 | B1 | * | 2/2001 | Otomo et al. ................ | 303/20 |
| 6,305,511 | B1 | * | 10/2001 | McCann et al. ............ | 188/265 |
| 6,405,836 | B1 | * | 6/2002 | Rieth et al. ................. | 188/72.1 |
| 6,742,632 | B2 | * | 6/2004 | Treyde ....................... | 188/73.35 |
| 6,938,735 | B1 | * | 9/2005 | Hilzinger .................... | 188/72.1 |
| 2004/0195055 | A1 | * | 10/2004 | Gilles ........................ | 188/73.1 |

* cited by examiner

*Primary Examiner*—Robert A. Siconolfi
(74) *Attorney, Agent, or Firm*—Scott A. McBain

(57) ABSTRACT

A brake system including a brake pad shaped and located to apply pressure to a brake rotor and an actuator shaped and located to apply pressure to the brake pad to cause the brake pad to apply pressure to the rotor. The system further includes a sensor material which varies in resistance when the actuator applies pressure to the brake pad, wherein the sensor material include an electrically insulating material with electrically conductive particles distributed therein. The system further includes a controller operatively coupled to the sensor material to detect a change in resistance of the sensor material.

29 Claims, 4 Drawing Sheets

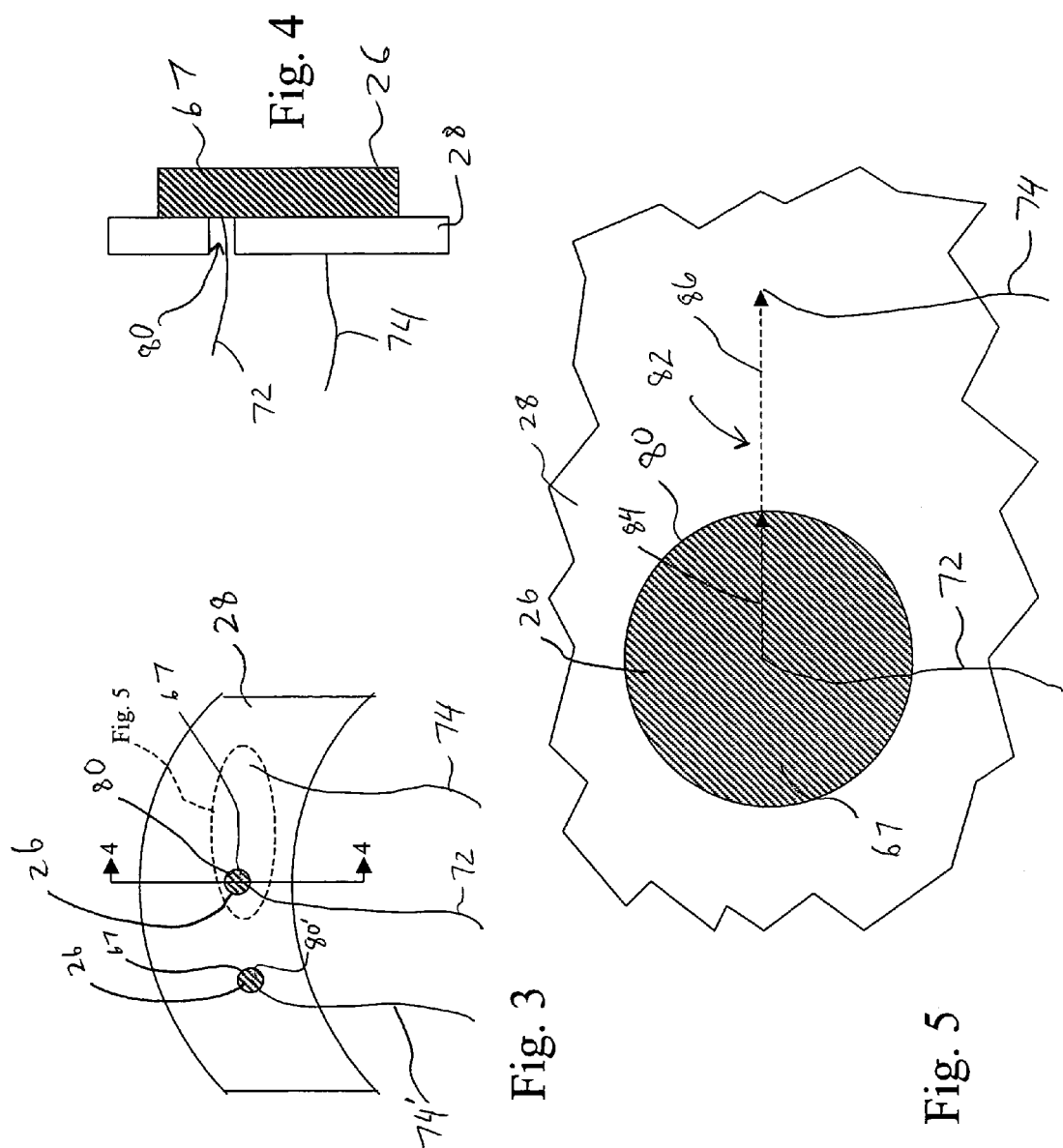

BRAKE FORCE SENSOR

TECHNICAL FIELD

The present invention is directed to a brake force sensor, and more particularly, to a brake force sensor having a resistance that varies with pressure.

BACKGROUND

Motorized vehicles are increasingly integrated with computers and computer control systems to provide quick and responsive control systems for the vehicle. Thus, it is desired to accurately track the status of various compartments of a vehicle for processing by the computer/computer system. In particular, as vehicles incorporate "drive by wire" and "brake by wire" systems it is desired to monitor the force applied by a brake (i.e. the force applied by the brake caliper or brake pad to the brake rotor). Although the position of the pedal of the brake system may be monitored to provide an estimate of brake force, it is of course more accurate to detect the brake force closer to the actual application of the brake. Accordingly, there is a need for a brake force sensor which can measure the brake force, as well as a brake force sensor which is reliable and robust.

SUMMARY

The present invention is a brake force sensor which can accurately measure brake force and which is reliable and robust. In particular, the brake force sensor of the present invention may utilize a material having an electrical resistance that varies with pressure, and the sensor material may be located in or immediately adjacent to the brakes to determine the brake force.

In one embodiment the invention is a brake system including a brake pad shaped and located to apply pressure to a brake rotor and an actuator shaped and located to apply pressure to the brake pad to cause the brake pad to apply pressure to the rotor. The system further includes a sensor material which varies in resistance when the actuator applies pressure to the brake pad, wherein the sensor material include an electrically insulating material with electrically conductive particles distributed therein. The system further includes a controller operatively coupled to the sensor material to detect a change in resistance of the sensor material.

In another embodiment the present invention is a motorized vehicle including a chassis, a plurality of wheels supporting the chassis, with each wheel including a brake rotor rotationally coupled thereto, and a brake pad shaped and located to selectively apply pressure to an associated rotor to thereby brake an associated wheel. The vehicle includes an actuator shaped and located to apply pressure to the brake pad to thereby cause the brake pad to apply pressure to the associated rotor and a sensor material which varies in resistance when the actuator applies pressure to the brake pad. The sensor material includes an electrically insulating material with electrically conductive particles distributed therein. The vehicle further includes a controller operatively coupled to the sensor material to detect a change in resistance of the sensor material.

Other objects and advantages of the present invention will be apparent from the following description and the accompanying drawings.

BRIEF DESCRIPTION OF THE DRAWINGS

FIG. 3 is a front view of the brake pad and backing plate of the brake of FIG. 2;

FIG. 4 is a side cross section taken along line 4—4 of FIG. 3;

FIG. 5 is a detail view of the labeled area of FIG. 3;

DETAILED DESCRIPTION

Figure 1:
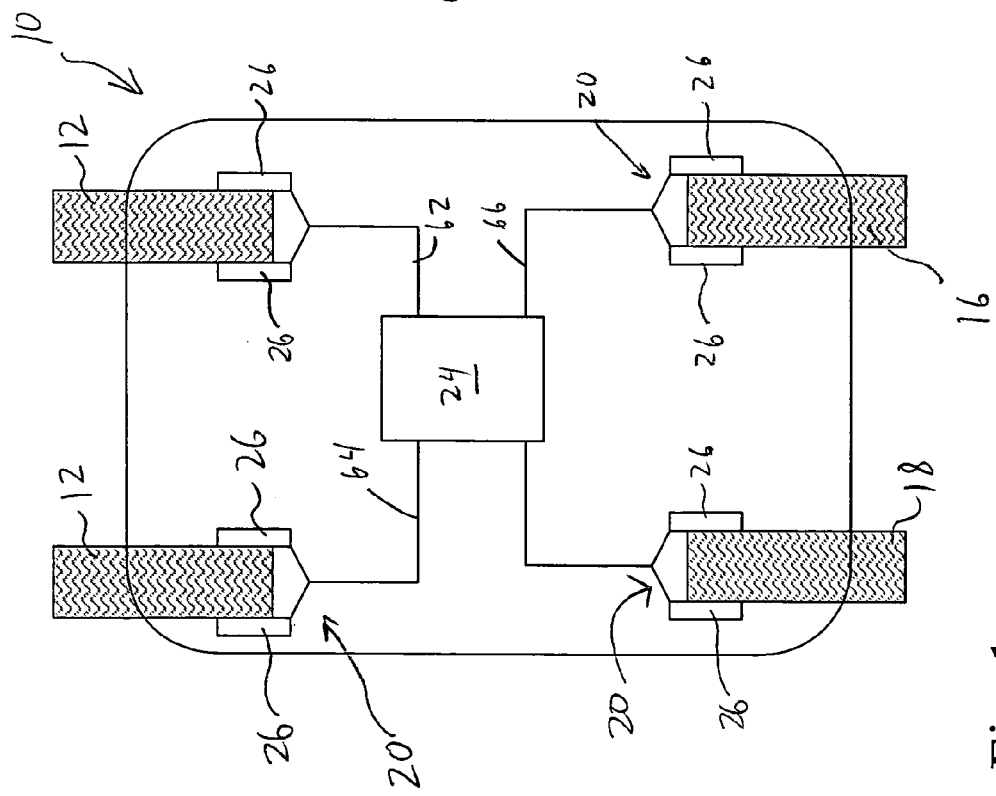
FIG. 1 is a schematic representation of a vehicle which may include the brake force sensor of the present invention.

As shown in FIG. 1, a vehicle, generally designated 10, may include a pair of front wheels 12, 14 and a pair of rear wheels 16, 18. Each wheel 12, 14, 16, 18 may include an associated brake or brake subsystem, each generally designated 20. The vehicle 10 may include an electronic controller, processor, CPU, microprocessor, computer or the like (together termed a "controller" 24 herein) to monitor the status of the vehicle 10, brakes 20 and its various subsystems. For example, the controller 24 may monitor the linear speed, linear acceleration, rotational speed, rotational acceleration, road conditions, atmospheric conditions, slip status of the wheels, the vehicle heading requested by the driver (i.e., position of the steering wheel), brake position or pressure, brake pressure requested by the driver, throttle position, throttle position requested by the driver, etc. The controller 24 may control various systems of the vehicle 10, such as anti-lock brake systems, vehicle stability control systems, traction control systems, etc.

Figure 2:
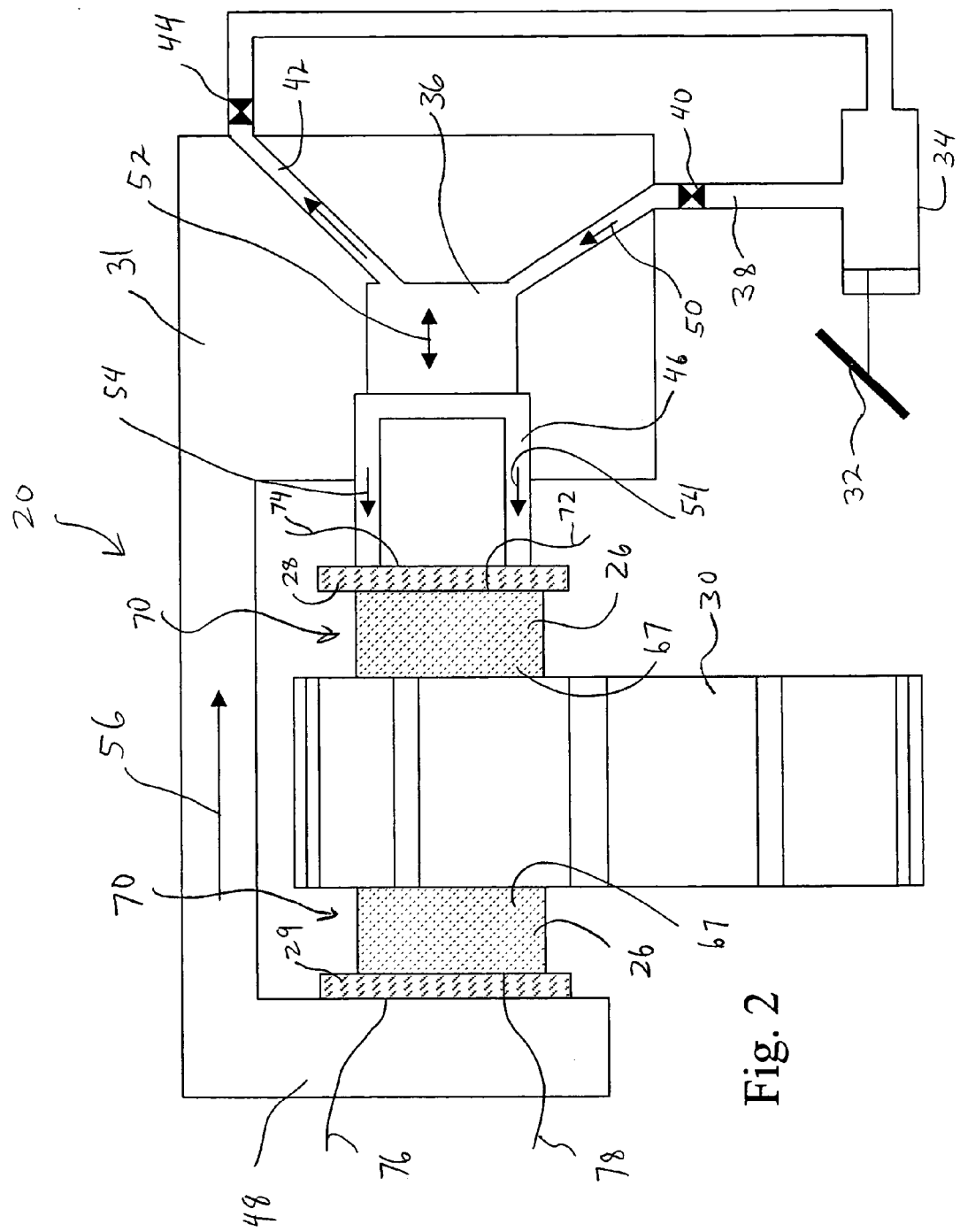
FIG. 2 is a schematic representation of a brake including the brake force sensor of the present invention.

Each brake 20 may be, for example, a disc brake, a drum brake or other types of brakes. In the illustrated embodiment, each brake 20 is a disc brake and includes a brake pad 26 located on opposite sides of the associated wheel (or rotor), which may be operated to exert a pressure on the associated wheel or rotor to thereby slow rotation of the wheel. For example, as shown in FIG. 2, a brake subsystem 20 may include a pair of brake pads 26 located on opposite sides of a rotor 30. The rotor 30 is typically rotationally coupled to one of the wheels 12, 14, 16, 18.

Each brake pad 26 is coupled to a backing plate 28, 29 and the brake pads 26 and backing plates 28, 29 may be generally located inside a caliper 31. Each backing plate 28, 29 may be considered to be part of the associated brake pad 26. The caliper 31 may include a pressure cavity 36 located therein, and the brake subsystem 20 includes a piston 46 located between the pressure cavity 36 and one of the backing plates 28. The caliper 31 includes an end flange 48 located adjacent to the backing plate 29.

In the case of an analog brake system, the vehicle 10 includes a brake pedal 32 which is mechanically, electrically, or otherwise operatively coupled to a master cylinder 34 that is filled with brake fluid (not shown). The pressure cavity 36 is coupled to the master cylinder 34 via an inlet brake line 38 and an outlet brake line 42. The inlet brake line 38 includes an inlet valve or apply valve 40 located therein to control the flow of brake fluid from the master cylinder 34 to the pressure cavity 36. The outlet brake line 42 includes an outlet valve or release valve 44 located therein to control the flow of brake fluid from the pressure cavity 36 to the master cylinder 34. The apply valve 40 and release valves 44 may be two-position valves which allow the flow of fluid therethrough in one direction when open, and which block the flow of fluid therethrough when closed.

During a normal braking operation, a driver presses on the brake pedal 32 which causes pressure in the master cylinder 34 to rise. The increase in pressure in the master cylinder 34 is transmitted to the pressure cavity 36 (represented by arrow 50 of inlet brake line 38). An increase in pressure in the pressure cavity 36 (represented by arrow 52) urges the piston 46 to the left (as indicated by arrows 54) against the associated backing plate 28 and thereby causes the associated brake pad 26 to be urged into contact with the rotor 30. The frictional engagement of the brake pad 26 and rotor 30 causes the rotation of the rotor 30 and associated wheel to slow.

Simultaneously, pressure in the pressure cavity 36 causes the caliper 31 to move to the right, shown by arrow 56, thereby causing the end flange 48 of the rotor 30 to engage the other backing plate 29 and urge the associated brake pad 26 into contact with the rotor 30. In this manner, the backing plates 28, 29, piston 46, caliper 31 and/or end flange 48 alone or in various combinations, may be considered an actuator shaped and located to press against a brake pad 26 to cause the brake pad 26 to apply pressure against the brake rotor 30. When a driver releases the brake pedal 32, pressure in the system is reduced which allows the brake pads 26 to move away from the rotor 30.

Although the system shown in FIG. 2 is a hydraulic brake system, it should be understood that the present invention may also be used in an electric (electromechanical or brake-by-wire) brake system, as well as a hybrid brake system. In this case an electric motor and gearing is utilized to apply pressure to the backing plates 28, 29 and brake pads 26 in a well-known manner. In this case the electric motor, ball screw, backing plates 28, 29 or other components, alone or in various combinations, may be considered an actuator.

In the system shown in FIG. 1, the controller 24 is connected to the brake pedal 32, and/or master cylinder 34 and/or each of the brakes 20 via brake control lines 62, 64, 66, 68 to control the application of braking pressure to each of the wheels 12, 14, 16, 18. Each brake control line 62, 64, 66, 68 may be either a mechanical line (i.e. a hydraulic line filled with brake fluid in communication with the master cylinder 34 and/or pressure cavities 52), or an electric/electronic control line (i.e. for controlling operation of the valves 40, 42 or an electric motor), or both a mechanical line and an electric/electronic line such that the controller 24 is operatively coupled to the brakes 20. Each brake control line 62, 64, 66, 68 may also provide feedback from the brakes 20 to the controller 24.

Each brake subsystem 20 may include a sensor 70 (FIG. 2) for detecting or estimating the pressure applied by the brake pads 26 to the rotor 30. In one embodiment the sensor 70 may include a sensor material 67 which varies in electrical resistance with pressure. In particular, each brake pad 26 may include or be made of the sensor material 67. However, the sensor material 67 may not necessarily be part of a brake pad 26, and can be located in other positions, as will be described in greater detail below. In one embodiment, the brake pads 26 may be made entirely of the sensor material 67. For example, because brake pads 26 are typically made of an electrically insulating material, the sensor material 67 may be formed by taking typical brake pads/brake pad material and adding electrically conductive particles throughout the brake pads/brake pad material (although a wide variety of materials, including existing brake pad material, could be suitable for use as the sensor material 67 depending upon the nature of such materials). In the configuration shown in FIG. 2, the brake pads 26 are made entirely of (or substantially entirely of), and therefore also serve as, the sensor material 67.

The brake pads 26/sensor material 67 may be a material which experiences a change in electrical resistance with pressure. In one embodiment, each brake pad 26/sensor material 67 is a composite material which includes an electrically insulating material 59 that carries electrically conductive particles 61 therein (see FIG. 7). The electrically insulating material 59 may be made of or include a wide variety of materials, including but not limited to fiberglass, asbestos, KEVLAR® synthetic fibrous material or other synthetic fibrous materials, organic materials, ceramics, etc. The electrically insulating material 59 acts as a matrix material, and should be elastically deformable.

Figure 7:
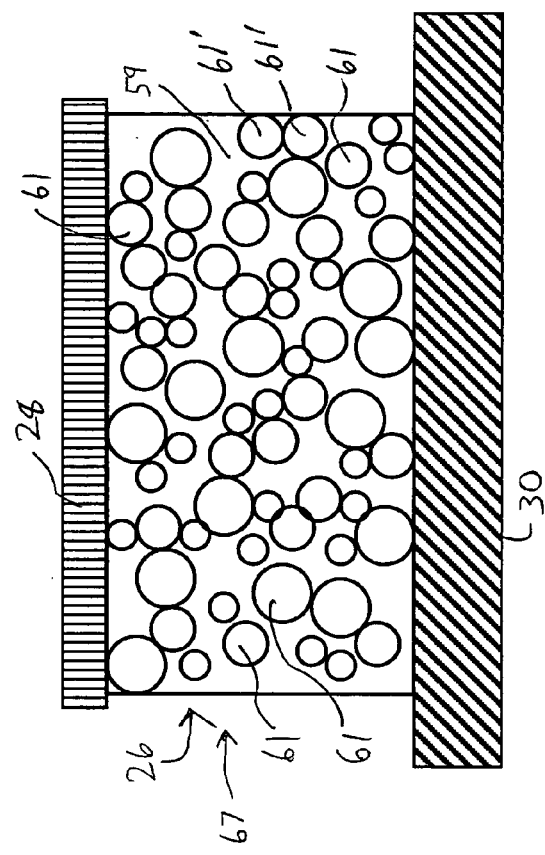
FIG. 7 is a schematic cross-section of a brake pad of the system of FIG. 2.

The electrically conductive specks or particles 61 may be metal particles (such as brass or copper) or nearly any other electrically conductive particles. The electrically conductive particles 61 preferably have a variety of different sizes to ensure efficient packing of the electrically conductive particles 61 in the electrically insulating matrix 59. Thus, although the size of the electrically conductive particles 61 may vary, the electrically conductive particles 61 may have a size of between about 500 Angstroms and about 50,000 Angstroms (FIG. 7 not necessarily being to scale). The size and distribution of the conductive particles 61 will affect the electrical performance of the sensor material 67. In one case the electrically conductive particles 61 may constitute between about 10 and about 30 percent of the sensor material 67 by volume, or between about 10 and about 40 percent by volume, or between about 10 and about 50 percent by volume.

Thus the "mixture" or composite material which forms the sensor material 67 may, as a whole, have the property that the material 67 changes in resistance as a function of pressure. Further, the sensor material 67 need not necessarily be made of the composite material including an electrically insulating matrix 59 and electrically conductive materials 61 described above. Instead, the sensor material 67 may also be or include materials whose smallest unit has piezoresistive qualities, such as semiconductors, crystals or the like. Further, materials which are primarily conductive material, which are loaded with particles or parts of insulating materials, may also be used as the brake pads 26/sensor material 67.

Accordingly, when the brake pad 26/sensor material 67 experiences pressure (as applied by the associated actuator 28, 29, 48, 31, 46 or motors, etc.), the brake pad 26/sensor material 67 may experience a change in its electrical resistance. In particular, when the brake pad 26/sensor material 67 is sufficiently loaded with electrically conductive particles 61 and pressure is applied to the brake pad 26/sensor material 67, the electrically insulating material 59 of the brake pad 26/sensor material 67 elastically deforms and the electrically conductive particles 61 are pressed into contact with each other (or contact or surface area between the electrically conductive particles 61 increases). For example, FIG. 7 illustrates two particles 61' pressed into contact with each other.

When exposed to sufficient pressure and under a voltage (either an AC or a DC voltage), percolation currents between the conductive particles 61 are created to increase the conductivity and decrease resistance of the brake pad 26/sensor material 67. The electrically insulating material 59 of the sensor material 67 is preferably generally elastic in character so that when the applied force is removed the electrically insulating material 59 (and the sensor material 67 as a whole) returns to its original position or shape and the resistance of the brake pads 26/sensor material 67 returns to its original level.

The brake pads 26 may have a wide variety of resistances, and in one embodiment have a resistance of between about 50 kOhms and about 100 MOhms when the brake pads 26 are not exposed to any mechanical pressure. The brake pads 26 may have a variety of thickness, for example, between about 0.01 inches and about 1 inch, or between about 0.03 inches and about 0.5 inches. A typical braking force applied by an actuator to the brake pads 26 may be up to about 5,000 Newtons. When exposed to a braking force of about 5,000 Newtons, the brake pads 26 may experience a change in resistance of at least about 5 kOhms, or at least about 10 kOhms, or at least about 50 kOhms, but could be more or less depending upon the choice of materials. Thus, the brake pads 26/sensor material 67 may experience a change in resistance of at least 0.1 percent, or at least about 1%, or at least about 2%, or at least about 10%, or at least about 20% when exposed to a braking force of about 5,000 Newtons.

The vehicle 10 or controller 24 may include various methods for tracking the change in resistance of the brake pads 26/sensor material 67. For example, as shown in FIG. 2, each brake 20 may include a set of leads 72, 74, 76, 78, wherein at least two leads are electrically coupled to each brake pads 26/sensor material 67. FIGS. 3, 4 and 5 illustrate a connection to a brake pad 26 associated with backing plate 28. As can be seen, the backing plate 28 may include an opening 80 formed therethrough to expose the brake pads 26/sensor material 67 underneath. A lead 72 is then passed through the opening 80 and into contact with the top surface of the brake pads 26/sensor material 67.

The lead 72 is preferably coupled to the brake pads 26/sensor material 67 at the center of the opening 80. Another lead 74 is coupled to the outer surface of the backing plate 28. The free ends of the leads 72, 74 are then connected to a current or voltage source, and to the controller 24 or a voltmeter or the like which can track the change in resistance across the leads 72, 74. If desired, the controller 24, voltmeter, etc. may be coupled to the leads 72, 74 by a wireless connection. The sensing system described above is a DC measurement system. However, it should be understood that the current passed through the leads 72, 74 could be an AC current and that is processed by an AC resistance sensing system.

As shown in FIG. 5, the path 82 of current flowing from lead 72 to lead 74 includes a part 84 in which the current flows across the brake pad 26, and a part 86 which flows across the backing plate 28. Because the backing plate 28 may provide very low (essentially zero) resistance, any change in resistance of the brake pads 26/sensor material 67 will affect the resistance of the part 84 of the current flow across the brake pads 26/sensor material 67 and can be measured or sensed by the controller 24. Thus part 84 of the total current flow 82 across the brake 20 provides a variable resistance which can be tracked.

Rather than having one lead 72 electrically coupled to the brake pads 26/sensor material 67 and another lead 74 electrically coupled to the backing plate 28, both leads may be electrically coupled to the brake pad 26. For example, as shown in FIG. 3, instead of or in addition to hole 80, the backing plate may include an auxiliary hole 80' formed therein, and an auxiliary lead 74' is passed through the hole 80' to make electrical contact with the brake pad 26. In this manner, a current path flowing from the tip of lead 72 to the tip of lead 74' is in theory more sensitive to changes in resistance of the brake pads 26/sensor material 67, which should provide a more sensitive brake force sensor 70 by essentially doubling the length of the current path 84.

The brake force (i.e. change in resistance of the brake pads 26/sensor material 67) may be monitored at only a single brake pad 26 of a wheel/rotor 30, or in each brake pad 26 separately, or both brake pads 26 collectively. When it is desired to monitor the braking force at each brake pad 26 separately (i.e., as shown in FIG. 2), the brake pads 26 should be electrically isolated from each other by, for example, insulating bushings (not shown). The change in resistance at both brake pads 26 can be collectively monitored by connecting a wire to the one of the brake pads 26/backing plates 28 and another wire to the other one of the brake pads 26/backing plates 29, and then running a current from one brake pad 26 to the other, for example, via the rotor 30 which is highly conductive and has essentially no electrical resistance. Changes in temperature may of course affect the measured resistance in the brakes 20, and an interface circuit or other temperature-compensating structure/devices may be used to accommodate the temperature effects in a well-known manner.

Further, the brake force sensor 70 may also operate as a worn brake sensor. In particular, the controller 24 may be programmed such that the controller 24 detects a worn brake lining when the resistance of the brake pads 26/sensor material 67 becomes sufficiently low (i.e., when no braking force is applied to brake pads 26/sensor material 67). For example, when the brake pads 26 become sufficiently thin, an electrical current may be carried across the associated rotor 30. In other words, when the brake pads 26 become very thin (i.e. on the order of the size of the conductive particles 61 or less) then the rotor 30 may effectively provide a short circuit and the current will no longer travel along the brake pad 26 and current path 84 would be eliminated. Thus, the controller 24 may be programmed to detect a low resistance and send a signal that the brake pad 26 is worn and should be replaced.

Furthermore, the particles 61 may be arranged a varying manner in the brake pad 26 so as to allow the controller 24 to detect a worn brake pad 26, even before the brake pad 26 become significantly worn. For example, the size and/or density of the particles may be arranged in a gradient across the thickness of the brake pad 26. In particular, in one example particles 61 having a larger average size may be located on the side of the brake pad 26 facing the backing plate 28, and particles 61 having a smaller average size may be located the side of the brake pad 26 facing the rotor 30. In this manner, wearing of the brake pads 20 will result in a gradual change in the average resistance provided by the brake pad 26, and this gradual change can be monitored to provide an estimate of brake pad wear and/or remaining brake pad life.

FIGS. 1–5 illustrate an embodiment of the invention wherein the sensor material of the brake force sensor 70 is located in or formed as part of the brake pad 26. However, the sensor material need not necessarily be located in or formed as part of the brake pad 26, and can be placed at a variety of other locations. The sensor material may be located in any other location which experiences a force proportional to or related to that applied by an actuator to the brake pads 26. The sensor material 67 may be positioned to experience a change in pressure when the piston 46/caliper 31 presses against the associated backing plate 28, 29 to cause the associated brake pad 26 to apply pressure against the brake rotor 30.

Figure 6:
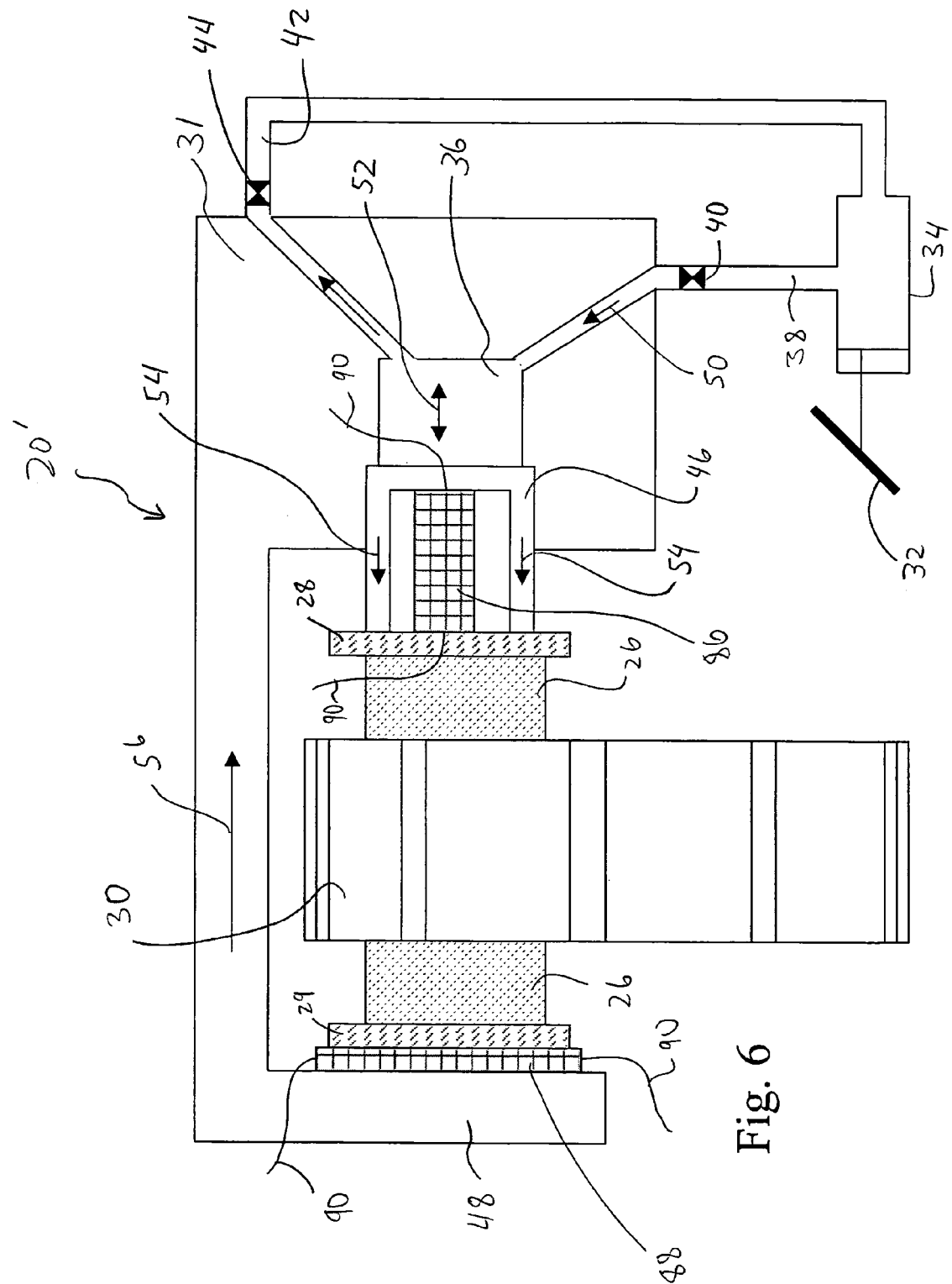
FIG. 6 is a schematic representation of a brake including another embodiment of the brake force sensor of the present invention.

For example, as shown in FIG. 6, a brake 20' may include a piece of sensor material 86 that is located between the actuator (i.e. piston 46) and the associated backing plate 28. In this case, the sensor material 86 may transmit at least part of the pressure from the piston 46 to the backing plate 28 and pad 26. In addition, or in the alternative, another piece of sensor material 88 may be located between the end flange 48 and backing plate 28. Various leads 90 may then be coupled to these sensor materials 86, 88 and coupled to the controller 24 such that the controller 24 can monitor the resistance of the sensor materials 86, 88 and therefore the applied brake force. If desired, another piece of sensor material 88 can be located on the opposite side of the brake 20' so that the other piece of sensor material 88 is located between backing plate 28 and brake pad 26.

In this arrangement (i.e., when the sensor material 86, 88 is not part of the brake pad 26) wear or replacement of the brake pad 26 does not affect the sensor/sensor material 86, 88. Furthermore, if the sensor material 86 is located inside the piston 46 (as shown in FIG. 6) the sensor material 86 may be protected from ambient conditions.

The present invention provides a relatively simple, accurate and robust sensor/system for measuring the applied brake force. The present invention provides advantages over strain gages (i.e. piezoresistive (semiconductor), carbon resistive, bonded metallic wire and foil resistant strain gauges) because such strain gauges must be securely bonded to a braking component. Reliably bonding the strain gauge to a braking component is difficult due to the materials, high temperatures, and high temperature cycles of the braking components. Furthermore, conventional strain gauges experience thermal offsets, RF-pick-up, magnet pick-up and plastic deformation. The present invention can be easily fit into existing brake systems with little to no modification.

In addition, the sensor or sensor material can be implemented in a wide variety of systems and uses beyond the use in brakes and brake systems described herein. For example, whenever applied stress or pressure is desired to be sensed (for example when a first pressure component applies pressure to a second pressure component) the sensor material of the present invention may be utilized. Thus, a washer made of the sensor material described herein may be placed between the head of a bolt and an anchor component to which the bolt is being threadedly attached. Wires or leads can then be attached to the washer, and its electrical properties measured or monitored to determine the force applied by the bolt. Of course, this is merely a single example of a wide variety of settings and structures in which the sensor material may be utilized.

Having described the invention in detail and by reference to the preferred embodiments, it will be apparent that modifications and variations thereof are possible without departing from the scope of the invention.

What is claimed is:

1. A brake system comprising:
a brake pad shaped and located to apply pressure to a brake rotor;
an actuator shaped and located to apply pressure to said brake pad to cause said brake pad to apply pressure to said rotor;
a sensor material which varies in resistance when said actuator applies pressure to said brake pad, wherein said sensor material include includes an electrically insulating material with electrically conductive particles distributed therein; and
a controller operatively coupled to said sensor material to detect a change in resistance of said sensor material wherein said sensor material is part of said brake pad.

2. The system of claim 1 wherein said sensor materials constitutes generally all of said brake pad.

3. The system of claim 2 wherein said sensor material has a thickness of between about 0.03 inches and about 0.5 inches.

4. The system of claim 1 wherein said actuator is a piston, caliper, electric motor or backing plate.

5. The system of claim 1 wherein said sensor material is a composite material.

6. The system of claim 1 wherein said electrically conductive particles are metal particles.

7. The system of claim 1 wherein said electrically conductive particles have an average size of between about 500 Angstroms and about 50,000 Angstroms.

8. The system of claim 1 wherein said electrically insulating material is a fibrous material.

9. The system of claim 1 wherein said electrically insulating material includes at least one of fiberglass, asbestos, synthetic fibrous material, organic materials or ceramics.

10. The system of claim 1 wherein said electrically insulating material is elastically deformable.

11. The system of claim 1 wherein said electrically conductive particles constitute between about 10 and about 30 percent of said sensor material by volume.

12. The system of claim 1 further comprising at least two leads operatively coupled to said controller, the tips of said leads being spaced apart such that a current extending between said tips travels at least partially on or through said sensor material.

13. The system of claim 1 further comprising a brake rotor such that when said brake pad applies pressure to said rotor said brake pad frictionally engages said brake rotor to slow any relative movement of said rotor.

14. The system of claim 13 further comprising a supplemental brake pad located on an opposite side of said rotor relative to said brake pad, said supplemental brake pad being shaped and located to apply pressure to said rotor to frictionally engage said brake rotor to slow any relative movement of said brake rotor.

15. The system of claim 13 wherein said brake system is a disc brake system or a drum brake system.

16. The system of claim 13 further comprising a motorized vehicle having at least one wheel which is rotationally coupled to said rotor.

17. The system of claim 16 wherein said brake system is an electromechanical brake system such that an electrical signal can be received by said actuator to cause said actuator to apply pressure to said brake pad.

18. The system of claim 1 wherein said sensor material varies in resistance when said actuator applies pressure to said brake pad primarily due to percolating currents which arise in said sensor material when said sensor material is under sufficient pressure and under either an AC or a DC voltage.

19. The system of claim 1 wherein said sensor material has a resistance of between about 50 kOhms and about 100 MOhms when said sensor material does not experience any mechanically applied pressure.

20. The system of claim 1 wherein said sensor material changes resistance by at least about 10 kOhms during a change in pressure of at least about 5000 Newtons.

21. The system of claim 1 wherein said sensor material changes resistance by at least about 2% during a change in pressure of at least about 5000 Newtons.

22. The system of claim 1 wherein the system further includes a backing plate located adjacent to said brake pad, said backing pad having an opening formed therein, said system including a lead extending through said opening to contact said brake pad.

23. A motorized vehicle comprising:
a chassis;
a plurality of wheels supporting said chassis, each wheel including a brake rotor rotationally coupled thereto;
a brake pad shaped and located to selectively apply pressure to an associated rotor to thereby brake an associated wheel;
an actuator shaped and located to apply pressure to said brake pad to thereby cause said brake pad to apply pressure to said associated rotor,
a sensor material which varies in resistance when said actuator applies pressure to said brake pad wherein said sensor material includes an electrically insulating material with electrically conductive particles distributed therein and wherein said sensor material is part of said brake pad; and
a controller operatively coupled to said sensor material to detect a change in resistance of said sensor material.

24. The system of claim 23 wherein said controller controls an antilock brake system for said vehicle.

25. The system of claim 23 wherein said sensor material changes resistance by at least about 2% during a change in pressure of at least about 5000 Newtons.

26. A brake system comprising:
a brake pad shaped and located to apply pressure to a brake rotor; and
an actuator shaped and located to apply pressure to said brake pad to cause said brake pad to apply pressure to said rotor, wherein said brake pad is generally entirely made of a sensor material which varies in resistance when said actuator applies pressure to said brake pad.

27. The brake system of claim 26 wherein said sensor material includes an electrically insulating material with electrically conductive particles distributed therein.

28. The brake system of claim 26 wherein said sensor material varies in resistance by at least about 2% under mechanical pressure of about 5000 Newtons as compared to a resistance of said brake pad when said brake pad is not under any mechanical pressure.

29. A brake pad comprising sensor material shaped to be coupled to a brake rotor, wherein said sensor material varies in resistance by at least about 2% under mechanical pressure of about 5000 Newtons as compared to a resistance of said brake pad when said brake pad is not under any mechanical pressure, wherein said sensor material includes an electrically insulating material with electrically conductive particles distributed therein.

* * * * *